J. A. WATSON.
CLUTCH.
APPLICATION FILED DEC. 14, 1918.

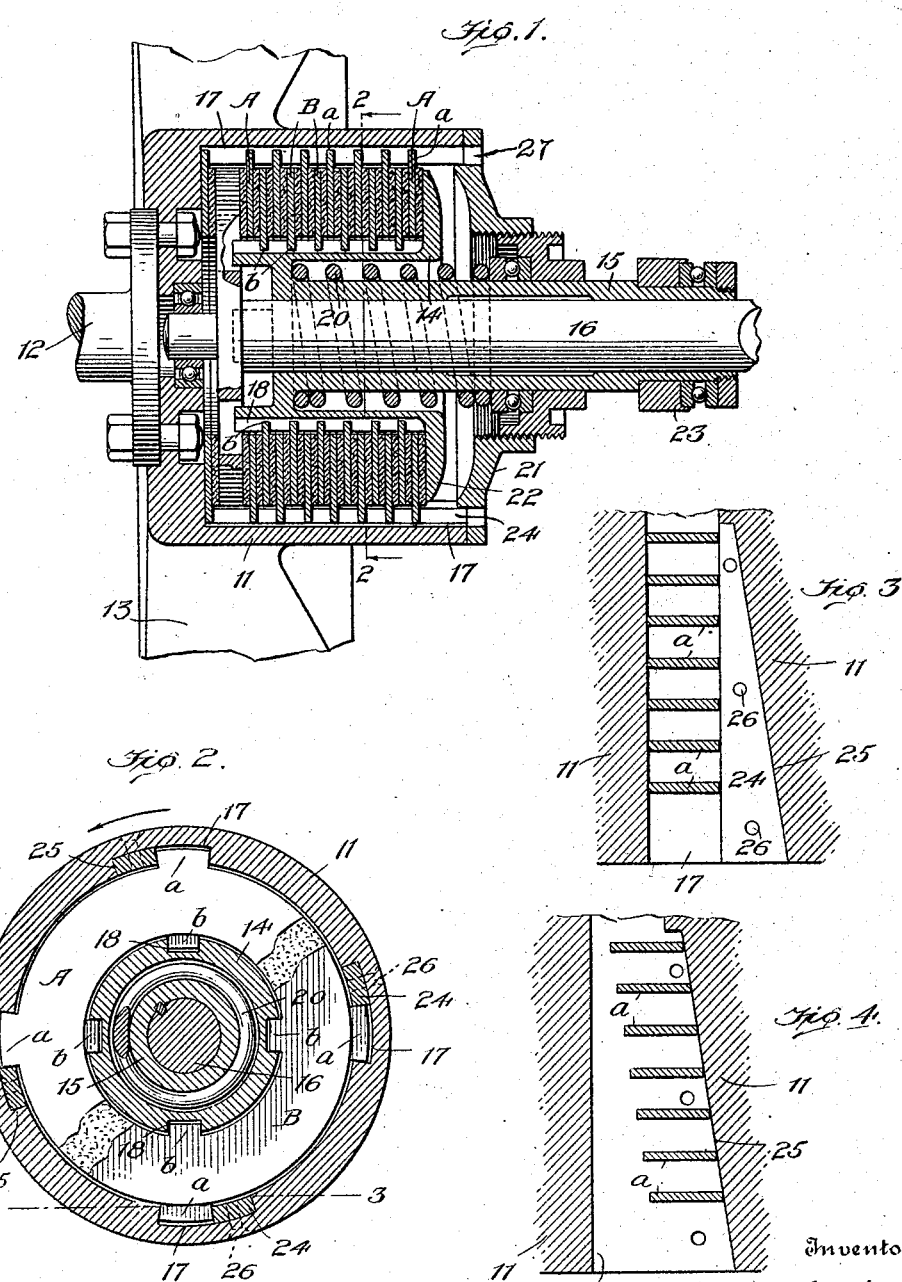

1,328,022.

Patented Jan. 13, 1920.
2 SHEETS—SHEET 2.

Witness
Edwin L. Bradford

Inventor
James A. Watson
By Foster Freeman Watson Kent
Attorneys

UNITED STATES PATENT OFFICE.

JAMES A. WATSON, OF SILVER SPRING, MARYLAND.

CLUTCH.

1,328,022.      Specification of Letters Patent.      Patented Jan. 13, 1920.

Application filed December 14, 1918. Serial No. 266,753.

*To all whom it may concern:*

Be it known that I, JAMES A. WATSON, a citizen of the United States, and a resident of Silver Spring, Montgomery county, State of Maryland, have invented certain new and useful Improvements in Clutches, of which the following is a specification.

In multiple disk clutches, and especially in dry plate clutches, there is often a tendency of the plates to adhere or stick together when the clutch is not in use, and especially when allowed to stand for a time under pressure of the clutch spring. In clutches which have become rusted or gummed with oil or partially burned by misuse the plates sometimes become "frozen" so as to prevent all relative movement of the two sets and it is necessary to remove the clutch assembly from the machine to separate the disks, often at considerable expense. This is particularly liable to happen in automobiles when stored or allowed to stand for a few days or weeks.

The object of the present invention is to provide means in a clutch for separating the disks when "frozen" and restoring the clutch to normal operative condition without removing the clutch assembly or disturbing the associated parts. This object is accomplished by so constructing the clutch that the plates or disks of one set may have a slight relative rotary movement when the direction of rotation of the clutch is reversed or when the driving disks become the driven disks. The invention may be better understood by reference to the accompanying drawings in which:

Figure 1 is a central sectional view of an automobile clutch embodying the invention;

Fig. 2 is a section on the line 2—2 of Fig. 1;

Fig. 3 is a section on the line 3—3 of Fig. 2 looking down;

Fig. 4 is a similar view showing the position of the lugs on the driving disks after wedge pieces have been removed and a slight reverse movement has been given to the clutch;

Figure 5:
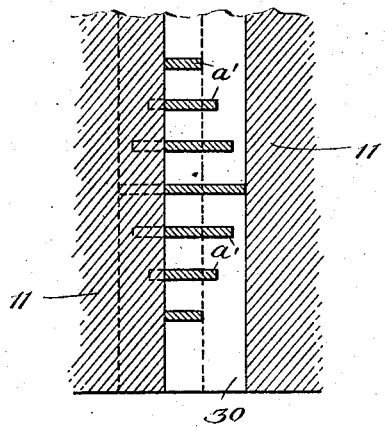
Figs. 5, 6, 7 and 8 are views similar to Fig. 3 but illustrating other embodiments of the invention.

This invention is applicable to disk clutches generally and the clutch illustrated in Figs. 1 and 2 of the drawing is the same in construction and operation as that shown in Letters Patent No. 1,164,531 with devices embodying the present invention added. It will only be necessary, therefore, to refer briefly to its general features.

The outer cylinder 11 is bolted to a driving shaft 12 which may be the crank shaft of an automobile engine, and a flywheel 13 may be integral with the cylinder 11. The inner cylinder 14 is connected to a sleeve 15 which slides on and turns with the driven shaft 16, being splined thereon. The cylinder 11 has a plurality of grooves 17 on its inner face parallel to its axis and the inner cylinder has like grooves 18 on its outer surface. A series of driving disks A have lugs *a* engaging the grooves 17 and a series of alternate disks B have lugs *b* engaging the grooves 18. The disks of the two series are normally pressed together by a spring 20 which, as shown, abuts against a thrust bearing carried by the end plate 21 of the cylinder 11 and against a shoulder of the cylinder 14, normally pressing a flange 22 of the cylinder 14 against the end disk A. The disks A are shown as faced with leather or fabric to promote frictional engagement and the action of the spring normally holds them in driving relation with the disks B. The spring is compressed and the disks disengaged by moving the sleeve 15 to the right by suitable means engaging a thrust bearing 23.

As shown in Figs. 2 and 3, the slots 17 have parallel side walls. One wall of each slot is formed by a wedge-piece 24 which fits an inclined wall 25 in the cylinder. The wedge pieces are removably secured to the cylinder 11, as by screws 26.

When the plates of a clutch become stuck or rusted together the difficulty in starting relative movement of the two series when the spring pressure is released has been due to the fact that all of the adhering surfaces must be released at the same instant, which often cannot be effected without taking apart the clutch assembly. According to the present invention the individual adhering surfaces are made to take the strain of separation one or two at a time and they yield successively. To accomplish this with the form of the invention shown in Figs. 1 to 4 inclusive the wedge pieces are released and removed endwise through the openings 27, the screws 26 being removed. Either the driving shaft or the driven shaft is then moved backward, causing the inclined wall 25 to engage the lugs a of disks A one at a time and break the adhesions between disks A and disks B successively, the clutch spring pressure being, of course, released during this operation. The disks A thus are moved relatively while the disks B are held to move together by lugs b and grooves 18.

Of course the inclined walls might be on the slots or grooves 18 of the inner cylinder, it being only necessary to provide for relative movement of the disks of one set while the disks of the other set move together. This is true also of the modified forms to be now described.

In the form of the invention shown in Fig. 5, the outer cylinder 11 is provided with relatively wide grooves 30 and the lugs $a'$ of the disks A are of different widths, the widest being in the middle substantially fitting the groove and those on either side being successively less in width. When the cylinder is rotated backward the groove 30 and the lugs $a'$ move to the positions shown in dotted lines. It being remembered that as the disks B are held against relative movement it will be observed that the relative movement of the disks A will break any adhesions between disks A and B successively two at a time.

Figure 6:
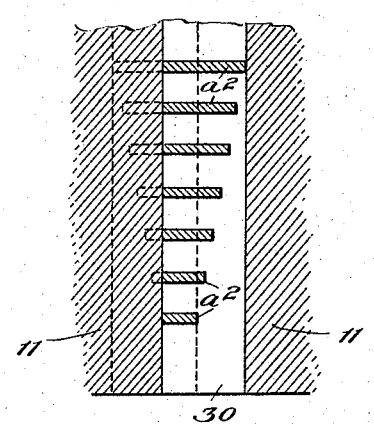

Fig. 6 represents a slight modification of Fig. 5, the difference being that the adhesions in the Fig. 6 device would obviously be broken one at a time. In Fig. 6 the lugs $a^2$ are in one series as to width while in Fig. 5 they are in two series. In both figures the groove walls are parallel thus preventing any tendency of the lugs to creep as they might on the incline shown in Fig. 4.

Figure 7:
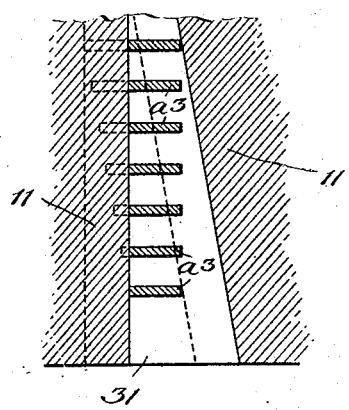

The modification shown in Fig. 7 is the same as that shown in Figs. 3 and 4 excepting that the wedges are omitted. In this figure $a^3$ indicates the lugs of disks A and they are all of the same width, while the groove 31 tapers to permit the lugs to move relatively.

Figure 8:
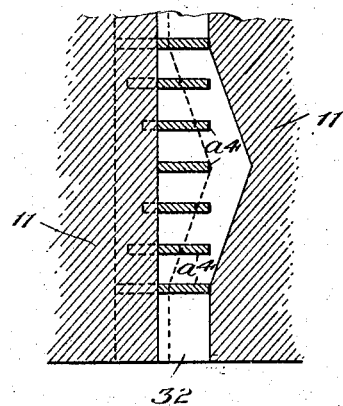

Fig. 8 represents a slight modification of Fig. 7 in which the groove 32 tapers in both directions from the middle, the lugs $a^4$ being all of the same width.

Figure 9:
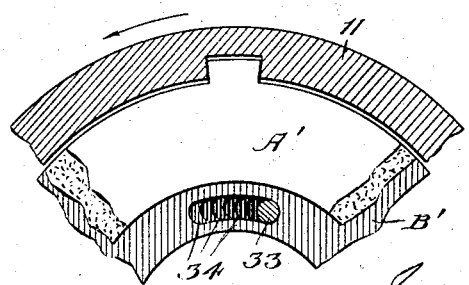
Fig. 9 is a partial transverse section illustrating still another embodiment.

In Fig. 9 is shown a clutch in which the disks A' are held to move together, in the usual manner, while the disks B' may move relatively to break adhesions. In this clutch, which is of a common type, the driven disks B' are slotted and act on pins 33 to drive the driven member. To permit the disks B' to move relatively the several disks have successively longer slots 34 which permit the successive disks to move different distances backward before encountering the pins 33.

In the ordinary operation of an automobile, a clutch embodying the foregoing improvements will operate exactly the same way as clutches at present in use. If, however, the plates of a clutch adhere by reason of dampness and rust, or from any other cause, they may be quickly separated so that the two sets may move independently by jacking up one of the rear wheels and turning it backward with the machine in "high" gear. This will put the strain of turning over the engine on one or two plates at a time and they will yield successively, whereas, it is sometimes impossible to cause the entire set of plates to yield in clutches as at present constructed. As soon as the adhesions between the plates are broken the clutch may be used in the ordinary manner.

It will be obvious that this invention is applicable generally to multiple disk clutches and that it may be embodied in other forms than those herein particularly described.

Having thus described the invention what is claimed as new and desired to secure by Letters Patent is:—

1. In a multiple disk clutch, an outer rotating member, a coaxial inner rotating member, a group of disks interlocked with the outer member, a group of disks interlocked with the inner member, the disks of said groups being alternately arranged, and the disks of one of said groups being relatively movable about their common axis when the clutch plates of both groups are operatively engaged in driving relation and the normally driven member is used as a driving member, for the purpose set forth.

2. In a multiple disk clutch, an outer rotating member, a coaxial inner rotating member, a group of disks interlocked with the outer member, a group of disks interlocked with the inner member, the disks of said groups being alternately arranged, and the disks of one of said groups having a limited relative movement about their common axis and a differential movement with respect to the member with which they are interlocked when the normally driven member is used as a driving member and the disks are in normal driving relation, for the purpose set forth.

3. In a multiple disk clutch, an outer rotating member, a coaxial inner rotating member, a group of disks interlocked with the outer member, a group of disks interlocked with the inner member, the disks of said groups being alternately arranged, and the disks of one of said groups when in normal driving relation with the disks of the other group being so interlocked with their engaging rotary member as to cause relative rotary movement of said disks when the driven member of the clutch is used as a driving member, for the purpose set forth.

4. In a multiple disk clutch, inner and outer rotary members, and two groups of alternately arranged disks intermediate said members, one group of disks being interlocked for rotation with one of said members and for partial relative rotation with respect to each other when all of said disks are in normal driving relation, for the purpose set forth.

5. In a multiple disk clutch, inner and outer rotary members, and two groups of alternately arranged disks, intermediate said members, and interlocked therewith respectively, the disks of one group having tongue-and-groove connections with the rotary member with which they are interlocked, the connections of some of said disks permitting greater relative movement of the disks and member than the connections of the remaining disks, when all of the disks are in normal driving relation, for the purpose set forth.

6. In a multiple disk clutch, inner and outer rotary members, and two groups of alternately arranged disks intermediate said members, and interlocked therewith respectively, the disks of one group having tongue-and-groove connections with the rotary member with which they are interlocked, the connections of the disks when all of the disks are in normal driving relation, permitting progressive relative movement of the disks with respect to the member, for the purpose set forth.

7. In a multiple disk clutch, two rotating members, and two series of disks interlocked with the members respectively, the interlocking means for one set of disks being constructed to permit said disks to have different rotary movements relatively to the member to which they are interlocked when all of the disks are in normal driving relation, for the purpose set forth.

8. In a multiple disk clutch, two rotary members, and two series of disks interlocked with the members respectively, one of said members having grooves parallel with its axis and the corresponding series of disks having lugs forming an interlocking driving connection with said grooves, said lugs and grooves embodying means to permit the disks to have different degrees of rotary movement with respect to said member, for the purpose set forth.

9. In a multiple disk clutch, two rotary members, and two series of disks interlocked with the members respectively, one of said members having grooves parallel with its axis, and the corresponding series of disks having interlocking driving connections with said grooves, and a removable wedge-shaped part forming one wall of each groove, for the purpose set forth.

In testimony whereof I affix my signature.

JAMES A. WATSON.